Feb. 16, 1971 E. HAARER ETAL 3,564,051
PRODUCTION OF ADIPIC ACID
Filed July 19, 1967
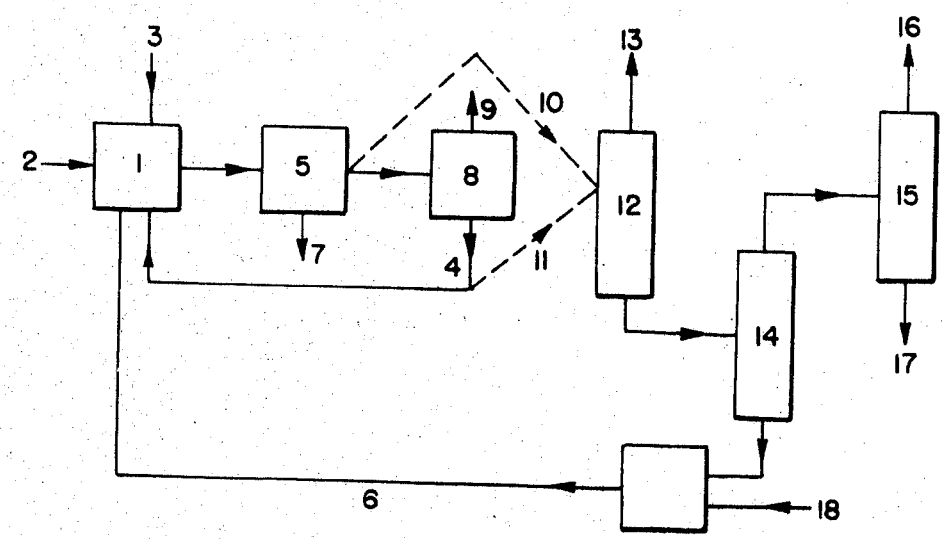
INVENTORS
ERICH HAARER
GOTTHILF WENNER
BY: Marzall, Johnston, Cook & Root
ATT'YS United States Patent Office 3,564,051
Patented Feb. 16, 1971

3,564,051
PRODUCTION OF ADIPIC ACID
Erich Haarer and Gotthilf Wenner, Ludwigshafen (Rhine), Germany, assignors to Badische Anilin- & Soda-Fabrik Aktiengesellschaft, Ludwigshafen (Rhine), Germany
Filed July 19, 1967, Ser. No. 654,642
Claims priority, application Germany, July 22, 1966,
P 15 68 146.6
Int. Cl. C07c 51/20, 51/28
U.S. Cl. 260—531                               9 Claims

ABSTRACT OF THE DISCLOSURE

Production of adipic acid by oxidation of cyclohexanol, cyclohexanone, ω-hydroxycaproic acid or mixtures containing such compounds with nitric acid in the presence of vanadium and optionally copper catalysts wherein the excess nitric acid is distilled off, the residue is fractionated under subatmospheric pressure without previous separation of the catalyst and the catalyst-containing bottoms product is fed into the next charge.

---

This invention relates to the production of adipic acid. More specifically the invention relates to working up reaction mixtures obtained in the production of adipci acid.

It is known that adipic acid can be prepared from cyclohexanol and/or cyclohexanone by oxidation with nitric acid in the presence of catalysts containing vanadium or vanadium and copper. Mixtures of oxidation products such as are contained in washing solutions which have been obtained in the oxidation of cyclohexane with air at elevated temperature and superatmospheric pressure and which contain mainly monocarboxylic acids, dicraboxylic acids and epsilon-hydroxy-caproic acid, may be used instead of cyclohexanol and/or cyclohexanone. The mixtures obtained in the oxidation with nitric acid contain not only adipic acid but also other dicraboxylic acids, for example gluaric acid and succinic acid. In the separation of the adipic acid which has crystallized out, a mother liquor is obtained which contains glutaric acid, succinic acid and the catalyst as well as small amounts of adipic acid. Some methods for working up these mother liquors are known in which both the said dicarboxylic acids and the catalyst are obtained in usable form.

A process for the production of adipic acid is described in U.S. patent specification No. 2,971,010 according to which the above-mentioned mother liquor, before or after the metal ions used as catalyst have been removed, is freed from nitric acid by fuming it off as oxides of nitrogen and the residue is distilled so that succinic anhydride and glutaric anhydride are obtained while adipic acid is recovered from the residue. Depending on the type of processing, the metal ions—in the form of the oxides— are either discarded or recovered by means of ion exchanges. Such a method either results in the loss of the catalyst or necessitates a troublesome process for its recovery.

According to the process of U.S. patent specification No. 3,148,210, the nitric acid is distilled off at a pressure of 10 to 400 mm. Hg, the residue is diluted and cooled and the catalyst component containing vanadium is precipitated in the form of a complex compound, this vanadium complex is dissolved in nitric acid, and copper is recovered by means of ion exchangers from the solution obtained in separating the vanadiaum complex. This method is also very troublesome.

A process is known from U.S. patent specification No. 3,290,369 according to which the nitric acid, preferably after sulfuric or phosphoric acid has been added, is also distilled off under subatmospheric pressure. The catalyst (in so far as it is present as insoluble salt) can be separated from the distillation residue by filtering the melt. The dicarboxylic acid mixture which remains is then subjected to distillation and crystallization. Filtering the melt is difficult and the catalyst components filtered off are lost.

U.S. patent specification No. 3,180,878 describes the unsatisfactory results of the known methods. It recommends that the dicarboxylic acid mixture freed from catalyst should be subjected to the complicated separation method which is describes.

It is an object of the invention to provide a process for the production of adipic acid by nitric acid oxidation of cyclohexanol, cyclohexanone, ω-hydroxycaproic acid or mixtures containing such compounds in the presence of vanadium catalysts or vanadium and copper catalysts in which the reaction mixture obtained is worked up in a simple way and the catalyst is recovered in a resuable form. It is another object of the invention to provide a process for the production of adipic acid in which no uncontrollable reactions take place during working up of the reaction mixture obtained. It is a further object to provide a process for the production of adipic acid in which loss of the catalyst components is avoided and in which the yield of adipic acid is increased. These and other objects and advantages will be better understood from the following detailed description.

We have found that adipic acid can be obtained very simply and with simultaneous recovery of the catalyst by nitric acid oxidation of (1) cyclohextanol, cyclohexanone or ω-hydroxycaproic acid or mixtures of such compounds, or (2) mixtures such as are contained in the washing solutions which are obtained in the oxidation of cyclohexane with air at elevated temperature and superatmospheric pressure in the presence of catalysts containing vanadium or vanadium and copper, separation of the bulk of the adipic acid, return of the bulk of the mother liquor into the oxidation zone after the nitric acid content has been concentrated to about the concentration of nitric acid in the oxidation zone and distillation under subatmospheric pressure of the nitric acid from the portion of the mother liquor which has not been returned, by carrying out the fractionation of the residue remaining after the nitric acid has been distilled off, without previous separation of the catalyst, at 5 to 50 mm. Hg and separating it into (a) a fraction of succinic acid and glutaric acid which can be separated by conventional methods into its components and (b) a bottoms consisting substantially of adipic acid and catalyst, the said bottoms being used again for another bath for the oxidation of the said starting materials by means of nitric acid.

It is surprising that the catalyst can be obtained in such a simple way in a form which it can be reused and without loss of adipic acid, glutaric acid and succinic acid, because it is known from U.S. patent specification No. 3,148,210, column 1, lines 60 to 64, that heating of the mother liquor containing catalyst and evaporation to dryness results in violent and dangerous oxidations.

The starting material may be cyclohexanol, cyclohexanone, ω-hydroxycaproic acid, mixtures of these compounds or aqueous solutions which are obtained in the washing of oxidation mixtures (such as are obtained in the oxidation of cyclohexane with air in the liquid phase at elevated temperature and superatmospheric pressure, preferably in the presence of oxidation catalysts) with water, whether it be after the oxidation of the cyclohexane or between the individual stages of the oxidation. They contain about 20 to 50% by weight of organic substances. The content of omega-hydroxycaproic acid or its lactone is the most important for the production of adipic acid. The percentage content of the most important components is approximately within the following limits, in each case with reference to the total amount of organic substances:

| | | |
|---|---|---|
| (a) Monocarboxylic acids | Acetic acid | Up to about 5% by weight. |
| | Propionic acid | |
| | Butyric acid | Up to about 10% by weight. |
| | Valeric acid | |
| | Caproic acid | |
| (b) Dicarboxylic acids | Succinic acid | About 5 to 10% by weight. |
| | Glutaric acid | |
| | Adipic acid | Up to about 35% by weight. |
| (c) Hydroxycarboxylic acids and carboxylic acids other than those given under (a) and (b). | Omega-hydroxy Caproic acid (also as lactone) | About 30 to 50% by weight. |

A number of other byproducts of the oxidation of cyclohexane, some not precisely known, are contained in the said washing liquids in addition to the said acids. It is also possible however to use mixtures of this type from which part of the adipic acid has first been separated, for example after concentration and crystallization of part of the adipic acid. These solutions, which are also referred to as "washing solutions" for the sake of simplicity, contain up to 75% by weight of organic substances of the same type as above, the percentage proportions changing depending on the extent of the separation of adipic acid. Finally mixtures of monocarboxylic acids, dicarboxylic acids, and hydroxycarboxylic acids, whose composition corresponds approximately to the said washing solutions, may be used.

The nitric acid is used in a concentration of about 40 to 70% by weight, advantageously about 50 to 65% by weight. The percentages refer only to nitric acid and water, the organic constituents being disregarded. Nitric acid and compounds to be oxidized are used in the molar ratio of about 12:1 to 30:1, particularly 16:1 to 24:1. When using mixtures, the average molecular weights are taken.

The reaction temperature is about 30° to 85° and the pressure is about 1 atmosphere (standard pressure). It is advantageous to carry out the oxidation of cyclohexanol and/or cyclohexanone at about 75° to 80° C. and the oxidation of oxidation mixtures such as are contained in the washing liquors obtained in the oxidation cyclohexane, at 20° to 40° C.

Vanadium, preferably as ammonium vanadate, advantageously with an addition of copper, for example copper nitrate, is used as oxidation catalyst. Other vanadium compounds, for example vanadium pentoxide or vanadyl compounds, or other copper compounds, for example copper acetate or copper carbonate, may however also be used. Vanadium is added in an amount of 0.03 to 0.05%, particularly 0.04% by weight (calculated as ion, with reference to the reaction mixture) and copper (when used) in an amount of up to 0.15%, particularly up to 0.11% by weight (calculated as ion, with reference to the reaction mixture).

The bulk of the adipic acid is caused to crystallize out from the oxidation solution by cooling, for example to 30° C. or less, and is then separated.

The bulk of the mother liquor, about 90 to 98%, particularly 91 to 97.5%, is returned to the oxidation zone after the nitric acid has been concentrated, for example by evaporation of water, preferably by expansion in a column which is under a pressure of 10 to 100 mm. Hg, to the concentration of nitric acid in the oxidation zone. The remainder of the mother liquor which is not directly returned has a different composition depending on whether it is withdrawn before or, preferably, after the bulk has been concentrated. The composition prior to concentration is in general within the following range:

| | Percent by weight |
|---|---|
| Adipic acid | 4–8 |
| Glutaric acid | 5–10 |
| Succinic acid | 2–4 |
| Catalyst: | |
| Vanadyl nitrate | 0.06–0.12 |
| Copper nitrate | 0.3–0.50 |
| Nitric acid | 35–50 |
| Water | 40–50 |

The nitric acid together with water is distilled off at 80 to 600 mm. Hg and a temperature of 70° to 190° C. It is advantageous to carry out the distillation in two stages: in a first stage at 80 to 200 mm. Hg and a temperature of 70° to 100° C., evaporation being carried only so far that no crystallization takes place in the bottoms, and then to dryness (i.e. until the nitric acid has been removed) in a second stage at 400 to 600 mm. Hg and a bottoms temperature of 160° to 190° C., preferably in a downflow or falling-film evaporator. The residue freed from nitric acid and water is subjected to fractionation, glutaric acid and succinic acid being distilled as the overhead product, partly in the form of their anhydrides, at subatmospheric pressure, for example at 5 to 30 mm. Hg, and an appropriate temperature in the bottoms, for example 190° to 230° C., while adipic acid and catalyst remain as the bottoms. It is advantageous to use columns which, on the one hand, give sharp separation, i.e. have an adequate number of theoretical trays, for example ten to twenty, but, on the other hand, do not have too high a pressure loss, for example not more than 20 mm. Hg. The temperature at the top is kept at 160° to 190° C. (succinic acid melts at 185° C., but the melting point is depressed considerably by the presence of glutaric acid which melts at 98° C. so that even at temperatures below 185° C. a liquid mixture is present without stoppages being caused by crystalliaztion or sublimation).

The mixture of adipic acid and the components of the catalyst, which remains as the botoms product, is dissolved in three to five times its amount of 60% nitric acid at 70° to 80° C. and this solution is fed into the oxidation cycle of the adipic acid production unit. The yield of adipic acid is thus increased by about 3% beyond the usual 91 to 92% of the theory, while the loss of catalyst is almost completely avoided.

After a long period of operation, owing to insufficient purity of the starting materials and/or susceptibility to corrosion of the oxidation apparatus, further heavy metal ions may accumulate in the mother liquor to such an extent that the quality of the adipic acid obtained is impaired. If this happens, it is advantageous to dissolve the bottoms product in about three to five times its amount of water at 80° to 90° C., cool the solution to 30° C. and recover by filtration more than 90% of the adipic acid present and 50 to 60% of the vanadate and copper oxide. The copper oxide, adipic acid and vanadate are dissolved in 60% nitric acid and the solution is returned to the oxidation circulation system. The aqueous mother liquor contains about 30 to 40% of the vanadium salt and the other accumulated heavy metal ions as well as any traces of copper. The mother liquor may be discarded or processed for recovery of the vanadium salt.

The distillate of succinic acid and glutaric acid is separated by a conventional method, for example it is fed into another column in which succinic acid is distilled off at 150 mm. Hg and a reflux ratio of 3:1. The distillation temperature then is 180° C., the melting point of succinic acid. A bottoms temperature of 230° C. is set up, a temperature at which no decomposition of glutaric acid takes place because the catalyst components have been removed. To obtain the succinic acid in high purity, the distillate may be recrystallized from once to twice the amount of water.

This bottoms product is dissolved in 1000 parts of waout reflux at a pressure of 10 to 100 mm. Hg. A colorless distillate is obtained which consists of glutaric acid containing a small amount of glutaric anhydride.

The process will now be described in greater detail with reference to the diagrammatic drawing in an embodiment given by way of example. An oxidation vessel 1 is used for oxidation to adipic acid of the compound 2 with nitric acid 3 while supplying mother liquor 4 which has been obtained after adipic acid has been separated in 5 and while returning a nitric acid/adipic acid solution 6 of the catalyst. After the oxidation mixture has been cooled, the adipic acid which has crystallized out is separated at 5, for example by means of filters or by centrifuging, and removed through 7. Water is distilled off at 8 from the resultant mother liquor (either from the whole liquor or only from that part which is to be returned direct to the oxidation vessel 1) in such an amount that the original nitric acid concentration is restored. The residue (10 or 11) is fed to the distillation unit 12 where nitric acid 13 is distilled off. It may be reused. The bottoms product obtained in 12 is separated by distillation in 14. The overhead product from 14 is separated in another distillation unit 15 into succinic acid 16 and glutaric acid 17. The bottoms from the distillation unit 14 is redissolved by adding nitric acid 18 and this solution is returned to the oxidation vessel 1.

The invention is further illustrated in the following examples. Parts by weight bear the same relation to parts by volume as the kilogram to the liter.

EXAMPLE 1

2000 parts by weight of an acid mixture which has been obtained in the oxidation of cyclohexanol with nitric acid after the crystallized adipic acid has been separated and which has the following composition:

| | Percent by weight |
|---|---|
| Succinic acid | 2.4 |
| Glutaric acid | 4.7 |
| Adipic acid | 7.5 |
| Vanadyl nitrate | 0.10 |
| Copper nitrate | 0.43 |
| Nitric acid | 48.7 |
| Water | 36.0 | is introduced per hour into a still having a capacity of 1000 parts by volume and fitted with a circulation vaporizer. 744 parts of nitric acid and 590 parts of water are distilled off at 120 mm. Hg and a temperature of 78° C.

666 parts by weight per hour of a mixture is withdrawn from the bottoms of the distillation unit, i.e.

| | Parts |
|---|---|
| Succinic acid | 48 |
| Glutaric acid | 94 |
| Adipic acid | 150 |
| Vanadyl nitrate | 2.0 |
| Copper nitrate | 8.6 |
| Nitric acid | 230 |
| Water | 130 | and supplied to a corrosion-resistant falling-film evaporator which is heated to a temperature of 175° C. with steam at 9 atmospheres gauge. Withdrawal of the vapor is carried out under a pressure of 500 mm. Hg. The product obtained at the top is 230 parts of nitric acid and 130 parts of water.

The bottoms fraction consisting of

| | Parts |
|---|---|
| Succinic acid | 48 |
| Glutaric acid | 94 |
| Adipic acid | 150 |
| Vanadyl nitrate | 2.0 |
| Copper nitrate | 8.6 | is fed to a column which is provided with baffles and has fifteen to twenty theoretical trays, a maximum pressure loss of 10 mm. Hg being set up between the bottoms and the top of the column. A fraction of 142 parts is distilled off in this column at a pressure of 5 mm. Hg at the top and a reflux ratio of 2:1. This fraction boils at 165° to 170° C. and consists of a mixture of succinic acid and glutaric acid and their anhydrides. The bottoms fraction of 150 parts of adipic acid and 10.6 parts of heavy metal salts has 450 parts of nitric acid (at 80° C.) added to it so that the components are dissolved, and the solution is passed into the oxidation vessel where the oxidation of cyclohexanol to adipic is carried out at 78° C., while supplying cyclohexanol, 60% nitric and 97% of the mother liquor obtained in the recrystallization of the adipic acid and concentrated.

The adipic acid yield is increased by 3% as compared with a method of operation in which the catalyst is not returned; moreover it is not necessary to add fresh catalyst.

The distillate consisting of a mixture of succinic acid and glutaric acid is subjected to a further rectification at 150 mm. Hg and a reflux ratio of 3:1. 49 parts of a 98% succinic acid boiling at 180° C. is obtained as distillate, which is brought to a purity of 99.8% by crystallization from 100 parts of water.

The bottoms of 91 parts of glutaric acid is pale yellow in color and, depending on the purity requirements, may be converted by a single distillation under subatmospheric pressure into a water-clear product.

EXAMPLE 2

A dicarboxylic acid mixture which has been freed from nitric acid and water and which has the composition:

| | Percent |
|---|---|
| Succinic acid | 18 |
| Glutaric acid | 46 |
| Adipic acid | 36 | contains the following heavy metal ions:

| | Percent |
|---|---|
| Vanadium compounds | 0.6 |
| Copper salts | 2.4 |
| Iron | 0.1 |
| Cobalt | 0.01 |

1000 parts of this mixture is rectified as described in Example 1 and the distillate obtained is 590 parts of a mixture of succinic acid and glutaric acid. The bottoms of 360 parts contains, besides adipic acid and traces of glutaric acid:

| | Parts |
|---|---|
| Vanadium compounds | 5.8 |
| Copper salts | 23.3 |
| Iron | 0.97 |
| Cobalt | 0.097 | as heavy metal ions.

This bottom product is dissolved in 1000 parts of water at 80° C. and the solution is filtered. 23 parts of a black catalyst sludge is obtained having the composition:

Copper compound, 22.6 parts, 97% by weight
Vanadium salt, 0.29 part, 5% by weight
Iron, 0.0065 part, 0.67% by weight
Cobalt, 0.00023 part, 0.31% by weight of the heavy metal ions originally present.

The solution is cooled to 20° C. so that the dissolved adipic acid and some of the vanadium salt are precipitated.

The solid product is suction filtered and 310 parts of adipic acid is obtained which contains:

Vanadium, 3.20 parts, 55% by weight
Copper, 0.133 part, 0.5% by weight
Iron, 0.0335 part, 3.45% by weight
Cobalt, 0.00335 part, 3.45% by weight of the heavy metal ions originally present.

Both the catalyst sludge and the said solid product are taken up in nitric acid and used again for the oxidation of cyclohexanol.

With the mother liquor containing adipic acid and vanadium salt and obtained by filtration, which is discarded, more than 95% of the extraneous ions which have accumulated are removed with a loss of 40% of the vanadium originally used. The copper is recovered practically completely.

We claim:

1. In a process for the production of adipic acid in which an initial material selected from the group consisting of cyclohexanol, cyclohexanone, omega-hydroxycaproic acid, the lactone of omega-hydroxycaproic acid and mixtures of organic acids containing at least one of said group of compounds is oxidized with aqueous nitric acid in the presence of a vanadium catalyst dissolved in the aqueous nitric acid reaction mixture in order to yield an aqueous mother liquor from which the bulk of the adipic acid is recovered by cooling and separating solid adipic acid therefrom, the improvement for maximum recovery of the catalyst which comprises:

distilling off substantially all nitric acid and water from at least a 2% portion of the mother liquor after said separation of the bulk of the adipic acid, thereby leaving a residue containing adipic acid, succinic acid, glutaric acid and said catalyst;

fractionally distilling said residue without prior removal of the catalyst at 5 to 50 mm. Hg for separation thereof into (a) a distillate fraction of succinic acid and glutaric acid and (b) a second residue consisting essentially of said adipic acid and said catalyst; and recycling said second residue for dissolution in said aqueous nitric acid reaction mixture.

2. A process as claimed in claim 1 wherein said initial material is cyclohexanol.

3. A process as claimed in claim 1 wherein said initial material is the mixture of organic acids obtained by the air oxidation of cyclohexane at elevated temperature and superatmospheric pressure.

4. A process as claimed in claim 1 wherein said catalyst is selected from the class consisting of vanadium salts and mixtures of vanadium salts with copper compounds.

5. A process as claimed in claim 4 wherein said second residue consisting essentially of adipic acid and catalyst is dissolved in water while hot, the undissolved material separated, the remaining solution is cooled, the resulting crystallized adipic acid together with crystallized vanadate and any precipitated copper oxide are separated from the cooled solution, the undissolved material and the solid mixture consisting essentially of adipic acid, vanadate and any copper oxide are then redissolved in nitric acid and used in making up the aqueous nitric acid reaction mixture for the oxidation of said initial material.

6. A process as claimed in claim 1 wherein the bulk of the mother liquor, after separation of the solid adipic acid therefrom, is returned to the nitric acid oxidation step after the nitric acid content of said mother liquor has been concentrated to a nitric acid concentration of about 40 to 70% by weight as required for said nitric acid oxidation, and the remaining portion of the mother liquor which has not been returned is subjected to the remaining steps required for catalyst recovery.

7. A process as claimed in claim 6 wherein about 90 to 98% of the mother liquor is returned to the nitric acid oxidation step and the catalyst is recovered from the remaining 2 to 10% of the mother liquor.

8. A process as claimed in claim 6 wherein the initial material is cyclohexanol.

9. A process as claimed in claim 6 wherein the initial material is the mixture of organic acids obtained by the air oxidation of cyclohexane at elevated temperature and superatmospheric pressure.

References Cited
UNITED STATES PATENTS

| | | | |
|---|---|---|---|
| 3,549,512 | 8/1969 | Connolly et al. | 260—5370X |
| 3,290,369 | 12/1966 | Bonfield et al. | 260—537 |
| 3,148,210 | 9/1964 | Johnson et al. | 260—531 |
| 2,971,010 | 2/1961 | Gilby, Jr. et al. | 260—537 |
| 2,844,626 | 7/1958 | Kamlet | 260—537 |

LORRAINE A. WEINBERGER, Primary Examiner

R. S. WEISSBERG, Assistant Examiner

U.S. Cl. X.R.
260—533, 537

UNITED STATES PATENT OFFICE
CERTIFICATE OF CORRECTION

Patent No. 3,564,051   Dated February 16, 1971

Inventor(s) Erich Haarer et al.

It is certified that error appears in the above-identified patent and that said Letters Patent are hereby corrected as shown below:

Column 1, line 27, "adipci" should read -- adipic --; line 39, "dicraboxylic" should read -- dicarboxylic --; line 40, "gluaric" should read -- glutaric --; line 68, "vanadiaum" should read -- vanadium --. Column 5, line 9, "Thi bottoma product is dissolved in 1000 parts of wa-" should read -- The bottoms product is driven over with- --. Column 8, line 38, "3,549,512" should read -- 3,459,512 --.

Signed and sealed this 14th day of September 1971.

(SEAL)
Attest:

EDWARD M. FLETCHER, JR.
Attesting Officer

ROBERT GOTTSCHALK
Acting Commissioner of Paten